Nov. 30, 1971  HISASHI HAYASHI ETAL  3,623,397
PROCESS FOR MANUFACTURING A WEIGHTED ROPE
Filed March 13, 1969
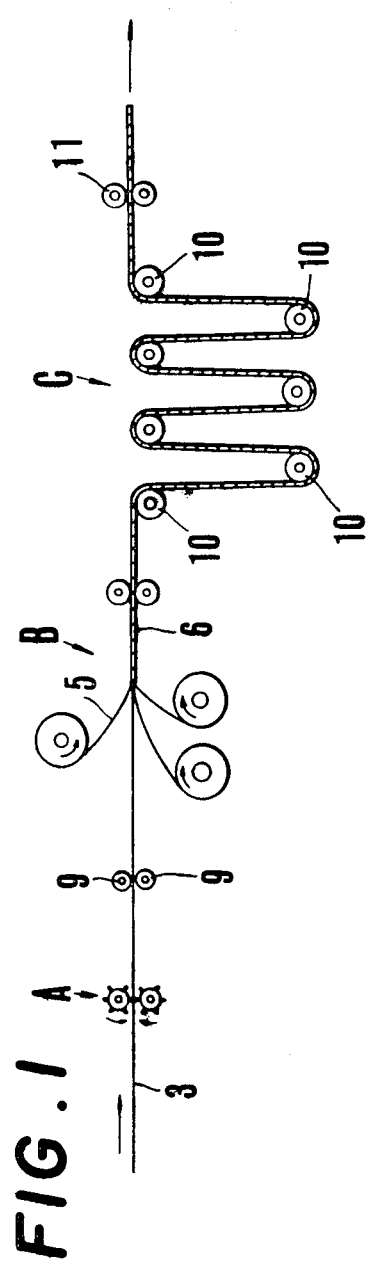
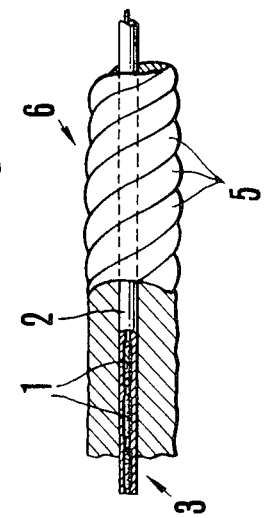
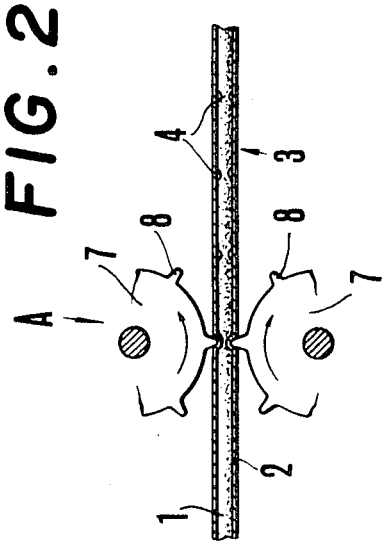

3,623,397
PROCESS FOR MANUFACTURING A WEIGHTED ROPE
Hisashi Hayashi and Yukio Hayashi, both of 2-16 Kagurazaka, Shinjuku-ku, Tokyo, Japan
Filed Mar. 13, 1969, Ser. No. 807,772
Int. Cl. D07b 1/06, 1/16, 5/00
U.S. Cl. 87—6
7 Claims

ABSTRACT OF THE DISCLOSURE

A process for manufacturing a weighted rope or line adapted to be used as the lead line for fishing nets in fisheries. The present manufacturing process for weighted rope making involves the steps of: preparing a weighted elongated core comprising an elongated metal rod covered closely with a tubular member having elasticity, flexibility and shear resistance, with said metal core having thereon longitudinally spaced notched locations at which the rod is ready to be broken under torsional force, tensile force or deflection force; twisting or braiding the weighted core together with strands in the form of a rope; and finally exerting the torsional force, tensile force or deflection force on the finished rope thereby cutting the metal rod at said notched locations so as to provide a weighted rope having weighting pieces which are embedded and arranged longitudinally in the rope in such a manner that they are spaced apart from each other.

---

The present invention relates to an improvement in a process for manufacturing a weighted rope which has a specific gravity more than that of water or sea-water and which is in particular adapted to serve as the lead line for fishing nets in the fisheries, more particularly, relates to an improvement in a process for manufacturing a weighted rope having a weighty core with yarns or strands twisted or braided around it.

As well-known to those skilled in the art, it has been preferred that the rope used for a trawl line or a lead line in the gill netting has a specific gravity heavier as far as possible in order to keep the trawl line or the gill net, being underwater, in a required condition for such fishing methods.

The ordinary type of weighted rope, proposed conventionally to this end, includes therein a core of a continuous metal wire covered with a synthetic resin sheath or tube which is rich in elasticity. This ordinary type rope, however, has the disadvantage that it is lacking in flexibility and therefore difficult in handling in the fisheries.

Prior to the present invention, an improved weighted rope has been recently developed with the object of eliminating the shortcoming as described above in connection with the ordinary type of weighted rope. Such weighted rope, developed prior to this invention, is provided therein a core in which metal pieces each having a fixed length are in series arranged longitudinally of the rope with a fixed spacing between any adjacent metal pieces, and further covered with an elongated elastic sheath or tube.

Such improved weighted rope constructed as described just above is superior to the first-mentioned type of weighted rope in bending property or flexibility, but has other defects as will be now described.

One manufacturing method of such weighted rope generally involves preparing a core consisting of an elongated lead rod covered with a synthetic resin sheath which is rich in resiliency and flexibility, then cutting or separating the lead rod only into short lead pieces by forcing cutter means against the lead rod from the outside of the sheath with minute attention to the absence of breaking or shearing of the sheath, and finally laying the resultant core in the rope.

In such production of the weighted rope as described just above, it has been found that, upon cutting or separating the lead rod only with no breaking or shearing of the sheath covering over the lead rod, skilled arts and minute attentions are required for selecting the cutting-edge's configuration on the cutter means and also for adjusting the cutting pressure exerted on the cutter means in accordance with hardness and thickness of the lead rod, commonly composed of alloyed lead with other metals such as antimony, bismuth and the like, as well as in accordance with type and thickness of the synthetic resin sheath or tube, and therefore operational control of the rope manufacture is extremely troublesome. It has been further found that, even if the sheath or tube is rich in resiliency or flexibility, the sheath is frequently injured or sheared in the cutting process of the lead rod to the extent that successive steps of rope making becomes impossible. Besides, it is quite difficult to keep or hold the short lead pieces at their locations, namely to keep the cut lead pieces against longitudinal displacement in the sheath before or while the weighted core is laid in the rope.

To cope with the former difficulty, namely with breaking or shearing of the sheath, the employment of thicker sheath or tube will be taken into consideration. However, such thicker sheath or tube results in the larger diameter of the rope core itself and consequently results in the larger diameter of the finished rope whereby the resistance exerted on the rope by running water is increased comparatively so that the trawl line or gill net under water becomes unstable.

On the other hand, to overcome the latter difficulty, namely to prevent the longitudinal displacement of the cut lead pieces in the sheath, it will be recommended to use the sheath or tube having thermal shrinkage property and to heat up the sheath or tube by, for example, heating means, just after the lead rod covered with said sheath being cut in short lead pieces, thereby causing the sheath to reduce radially so as to lock the short lead pieces against longitudinal displacement. However, this is not desired because available substances for the sheath or tube are limited to only the substance having thermal shrinkage property and also because additional steps for thermal shrinkage treatment are required with the result of making the entire rope manufacturing process complicated.

It is a primary object of the present invention to provide an improved, novel and simple process for manufacturing a weighted rope which is considerably rich in elasticity or flexibility with no regard for a provision of a rigid, weighted core with yarns or strands twisted or braided around it.

It is another object of the present invention to provide an improved, novel and simple process for the manufacture of a weighted rope, wherein the manufacturing operation in rope making may be effected with a minimum of shut-downs due to breakage or shearing of the weighted core.

It is a further object of the present invention to provide an improved and novel process for the manufacture of a weighted rope in which breakage or parting of the rope core during the use of the rope is substantially obviated so that the rope is not lowered in quality even after an immoderate use extending over a long period of time.

A still further object of the present invention is to provide an improved and novel process for the manufacture of a weighted rope, which consists of the steps of preparing a weighted elongated core comprising an elongated lead rod or wire covered closely with a sheath or tube having elaticity, flexibility and shear resistance, with said lead rod or wire having thereon longitudinally spaced depressions or dents at which the lead rod is ready to be broken under tension, deflection or torsional force, thereafter twisting or braiding the weighted core to gether with strands in the form of a rope, and finally exerting the tension, deflection, torsional force or the combination thereof on the rope thereby cutting or separating the lead rod into cut lead pieces at said depressions or dents so as to provide a weighted rope having weighting pieces which are embedded and arranged longitudinally in the rope in such a manner that they are spaced apart from each other.

According to the present invention, it will be understood that the metal rod or wire which is referred herein to as "lead rod" is not limited to a pure lead rod but includes alloyed lead wires with tin, antimony and the like, or other soft metal wires. Besides, the elastic substance for the sheath or tube to cover the lead rod is preferably composed of elastic synthetic resin such as rubber, vinyl chloride, polyethylene or the like.

In accordance with the present invention, the lead may be first of all indented or impressed thereon at each fixed length by passing it between a pair of opposed rotary impressing rolls with circumferentially equi-spaced impressing edges therearound, and then the resultant lead rod having thereon depressions or dents at each fixed length is covered successively with the synthetic resin sheath or tube which is rich in elasticity. Alternatively, the lead rod may be first covered with the sheath or tube having elasticity, and thereafter passed through the impressing rolls of the type as described above to thereby form the dents or depressions at each fixed length interval on the lead rod without breakage or rupture of the sheath or tube.

In the step of laying the rope core, prepared by any one of the methods as described just above, in the rope, there are provided two techniques available. In one technique, the first operation consists of the formation of a strand having the weighted core with yarns twisted or braided aroundt it. After the strands each having therein the weighted core are formed, such strands are twisted or braided in the rope to obtain the weighted rope. Whereas the second technique involves preparing previously strands with no weighted core, and then twisting or braiding the strands together with a single weighted core situated among said strands.

In connection with the final step of the present manufacturing process in weighted rope making, by which the lead rod or wire embedded in the rope is cut away or separated into a series of lead pieces at the indented or depressed locations where breaks are most likely to occur, there may be conceived three methods, one of which involves stretching the rope over the ductile property of the lead wire under tensile force exerted thereon along its axial direction to cut the lead wire only into a plurality of lead pieces by taking advantage of the difference between ductile properties of the lead wire and the yarns twisted or braided in the rope.

The second method involves passing the rope back and forth between series rolls with acute folding angles through a sinuous path thereby applying the bending or deflecting force on the rope to cut or separate the lead wire only into a plurality of lead pieces by dint of the difference between bending or deflecting strengths as well as ductile properties of the lead wire and the yarns of the rope.

The third method includes applying torsional stress on the rope, while simultaneously stretching the rope, to thereby cut or separate the lead wire only into the short lead pieces by taking advantage of the difference between torsional strengths of the lead wire and the yarns of the rope.

As will be appreciated from the foregoing, specifically, a feature of the technique according to the present invention resides in that the lead wire or rod covered with the elastic sheath is merely indented or depressed at each predetermined longitudinal interval, prior to incorporation into the rope, rather than completely cut or separated into short lead pieces.

Another feature of the present invention resides in that the lead rod or wire, after completely embedded or incorporated into the rope or strands, is cut or parted into a plurality of lead pieces at its dented or depressed locations by application of the tensile force, torsional force, bending or deflecting force or the combination of these forces on the rope or strand.

The improved and novel manufacture of the weighted rope according to the present invention having the features as pointed out in the foregoing description provides the following advantages in contrast to the prior manufacturing arts.

It permits the elimination of an injury of the sheath or tube covering over the lead rod or wire so that cutting or breaking of the rope core in the course of rope making is substantially avoidable. As a result the production of inferior rope in which no weighted rope core is present may be eliminated and further the continuous, easy operation of weighted rope making is ensured with no shut-down due to breakage of the rope core.

It permits, further, the omission of additional complicated steps such as, for example, the shrinkage treatment of the sheath or tube in the prior arts. That is to say, since the lead rod or wire is cut or separated into the lead pieces after it has been completely embedded or incorporated in the rope or strand, the cut lead pieces may be securely locked or held in place against longitudinal displacement in the sheath, even if with no additional step to hold the cut lead pieces in place, by means of the strand or rope itself twisted or braided around the rope core. As a result, the superior weighted rope may be easily manufactured, in which the cut lead pieces to add weight to the rope are distributed with uniformity over the full length of the rope.

The foregoing and additional objects, advantages and features of the present invention will be pointed out in following description and claims and illustrated in the accompanying drawings, which disclose by way of example, the principle of the invention and the best mode which has been contemplated of applying that principle.

In the drawings:

FIG. 1 is a schematic view illustrating a manufacturing process in rope making according to the present invention;

FIG. 2 is a schematic front view, a part broken away, of an essential step in the manufacturing process of FIG. 1; and FIG. 3 is a fragmentary front view, with a part being shown in a longitudinal sectional view, of a weighted rope manufactured by the process of the present invention.

Reference is now had to be made to FIGS. 1 and 2 in which a preferred embodiment of this invention is schematically illustrated. A lead rod or wire designated by the reference character 1 is continuously covered or coated with an elastic sheath or tube 2, made of for example vinyl chloride, at a first station (not shown in the drawing) to thereby provide a rope core 3 which is heavy in weight. Thereafter, the rope core 3 thus provided runs in an arrow-marked direction, namely, rightwards as in FIG. 1, towards a second station A in which is provided impressing means as will be now described in detail with reference to FIG. 2.

Referring especially to FIG. 2, the impressing means situated at the second station A is to form depressions or dents 4 on the lead wire 1 at each fixed longitudinal interval and comprises a pair of rolls or drums 7 and 7 arranged in opposite relation to each other with a spacing therebetween which is substantially equal to or larger than the diameter or thickness of the rope core 3. Around the rolls 7 and 7 are formed integral therewith a plurality of impressing edges 8 which are projected radially outwardly and also equi-spaced circumferentially of the rolls or drums 7 and 7. It is to be understood that the impressing edges are so blunt that they do not injure the sheath or tube 2. The opposed rolls 7 and 7 are driven from a motor (not shown) so as to make rotation in synchronization with the feed rate of the rope core 3. Preferably, the inter-roll spacing may be adjusted in accordance with the diameter or thickness of the rope core 3 to be fed between the rolls 7 and 7. It will be thus understood that the rope core 3, upon passing between the rotating rolls 7 and 7, is formed on the opposed sides thereof with a series of depressions or dents 4 at each fixed interval by means of the impressing edges 8 equi-spaced round the rolls 7 and 7. In this case, the sheath or tube covering over the lead wire 1, as being rich in flexibility, elasticity and shear resistance, is merely offset radially inwardly for a time at locations thereon where it is impressed or depressed under the impressing edges 8. Accordingly, the elastic sheath or tube 2 is not broken or injured while the lead wire 1 only may be depressed or indented from the opposed sides thereof at each fixed longitudinal interval. The rope core 3, subsequently, is introduced, through conveying rolls 9 and 9, among strands 5 and further combined with the strands 5. Whereupon, the strands 5 are twisted or braided together to form a weighted rope 6 having a weighted core 3 with strands 5 twisted or braided around it.

The weighted rope, further, is subjected to the bending or deflecting force, while being stretched under the tensile force, at a third station C to thereby cut or separate the continuous lead wire 1 into short lead pieces at the dented or depressed locations where breaks are most likely to occur.

The third or final step station C comprises a plurality of rolls or drums 10 which are in series arranged in such a manner that they are alternately offset laterally with respect to the rope-running direction. Thus, the weighted rope 6 having therein the continuous weighted core 3 is passed back and forth between the rolls under the tensile force so as to take a sinuous path whereby such rope 6 is subjected to the bending force exerted thereon to cut the lead wire 1 only in the cut lead pieces at the dents or depressions 4 by taking advantage of the difference between bending or deflecting strengths as well as ductile properties of the lead wire and the yarns twisted or braided in the rope. As a result, the superior weighted rope may be easily manufactured, in which the cut lead pieces to add weight to the rope are distributed and embedded uniformly over the full length of rope, as more clearly illustrated in FIG. 3.

The present invention has been shown and described with reference to a single preferred embodiment, but it will be appreciated that changes and modifications may be made from a knowledge of the teachings of the present invention which do not in truth and in fact depart from the concepts of the invention. Hence the invention is not to be limited or restricted to precisely what is shown and described, but rather should be construed in the light of the fundamentally new principles as embodied in the teachings disclosed herein.

We claim:

1. In a process for manufacturing a weighted rope having a weighted core with yarns or strands twisted or braided around it, the improvement comprising the steps of: covering a continuous metal wire with a continuous non-textile sheath of elastic resin; denting said metal core, thus covered with said sheath, at each fixed length by passing it through impressing means; embedding continuously said weighted core and sheath in a rope to thereby provide a weighted rope having therein said continuous weighted core and sheath, and thereafter applying an external force on said weighted rope to cut or separate said metal wire only into a plurality of cut metal pieces at each of said dents.

2. In a process for manufacturing a weighted rope having a weighted core with strands twisted or braided around it, the improvement comprising the steps of: covering a continuous metal wire with a continuous non-textile sheath of elastic resin; denting said metal wire, thus covered with said sheath, at each fixed length by passing it through impressing means; inserting said weighted core and sheath among yarns to thereby provide a weighted strand having said weighted core with yarns arranged around it; laying the resulting strands in a weighted rope; and finally applying an external force on said rope to cut said metal wire only into a plurality of short metal pieces at each of said indentations.

3. In a process for manufacturing a weighted rope having a weighted core with strands twisted or braided around it, the improvement comprising the steps of: covering a continuous metal wire with a continuous non-textile sheath of elastic resin; denting said metal wire, thus covered with said sheath, at each fixed length by passing it through impressing means; inserting said weighted core among yarns to thereby provide a weighted strand having said weighted core with yarns arranged around it; thereafter applying an external force on said weighted strand to separate said metal wire only into a plurality of cut metal pieces at each of said indentations; and finally lying the resulting strands in a rope.

4. A process according to claim 1, wherein the metal wire is of soft metal including pure lead and alloyed lead.

5. A process according to claim 1 wherein the external force exerted on the weighted rope or strand is a tensile force.

6. A process according to claim 1 wherein the external force is a bending force.

7. A process according to claim 1 wherein the external force is a torsional force on the axis of the rope.

References Cited

UNITED STATES PATENTS

| | | | |
|---|---|---|---|
| 1,050,748 | 1/1913 | Paulsson | 87—6 |
| 3,400,628 | 9/1968 | Herzog | 87—6 |

JOHN PETRAKES, Primary Examiner

U.S. Cl. X.R.

57—161